United States Patent [19]

Hartwig

[11] Patent Number: 4,638,752

[45] Date of Patent: Jan. 27, 1987

[54] SEWING MACHINE FOR PRODUCING A STITCH PATTERN

[75] Inventor: Jürgen Hartwig, Karlsruhe-Durlach, Fed. Rep. of Germany

[73] Assignee: Pfaff Haushaltmaschinen GmbH, Fed. Rep. of Germany

[21] Appl. No.: 782,721

[22] Filed: Oct. 1, 1985

[30] Foreign Application Priority Data

Oct. 4, 1984 [DE] Fed. Rep. of Germany ....... 3436366

[51] Int. Cl.⁴ .............................................. D05B 3/02
[52] U.S. Cl. .................................... 112/458; 112/221; 112/315; 112/266.1
[58] Field of Search ............... 112/458, 456, 453, 315, 112/316, 221, 121.12, 103, 78, 86, 266.1, 262.1

[56] References Cited

U.S. PATENT DOCUMENTS 4,242,974 1/1981 Beckerman .......................... 112/458
4,325,313 4/1982 Kawai et al. .................... 112/221 X
4,342,271 8/1982 Socha .............................. 112/315 X Primary Examiner—Peter Nerbun
Attorney, Agent, or Firm—McGlew and Tuttle

[57] ABSTRACT

A sewing machine has an electronic control for the production of at least one stitch pattern consisting of a plurality of different single stitches, with a read-and-write memory RAM for storing in memory at least the single stitches of the stitch pattern and with a feed mechanism whose feed adjustment occurs by a step motor controlled in accordance with the stored data of the read-and-write memory within the inactive phase of the feed mechanism. To carry out a feed variation exceeding the maximum number of steps of the step motor between two predetermined sewing stitches, the control unit contains a comparator which compares the magnitude of the displacement amount of the step motor before the next displacing movement is carried out with a given maximum displacement amount, in order to prevent a stitch formation between the point of insertion of the previous stitch and the desired point of insertion of the next following stitch when the maximum displacement amount is exceded.

7 Claims, 9 Drawing Figures

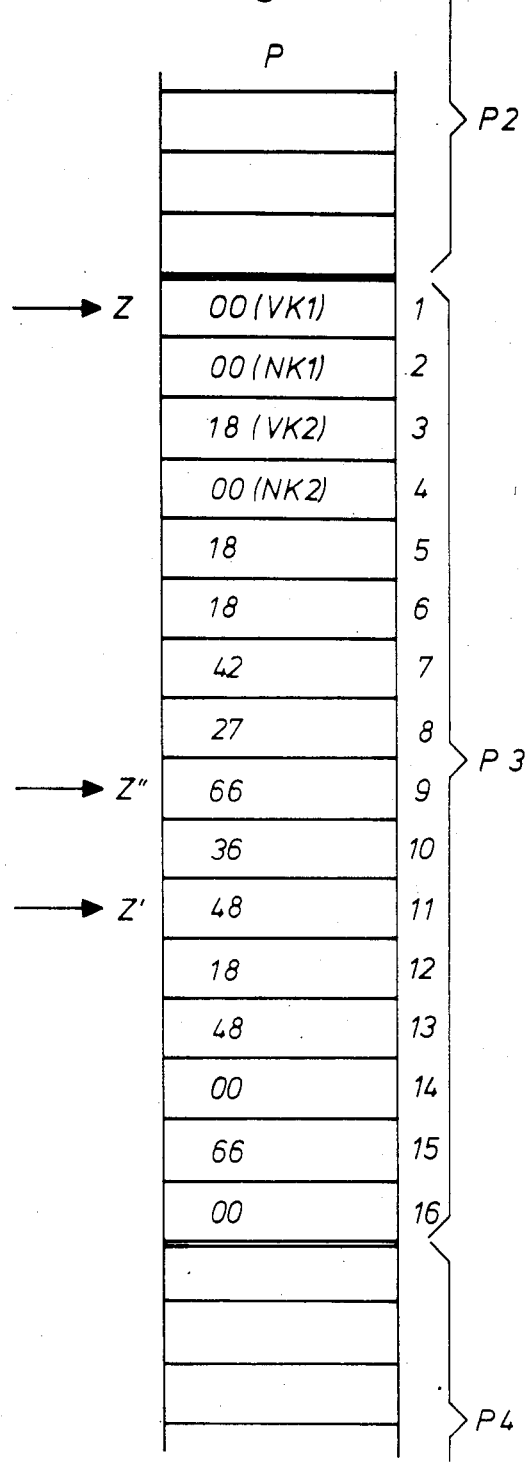
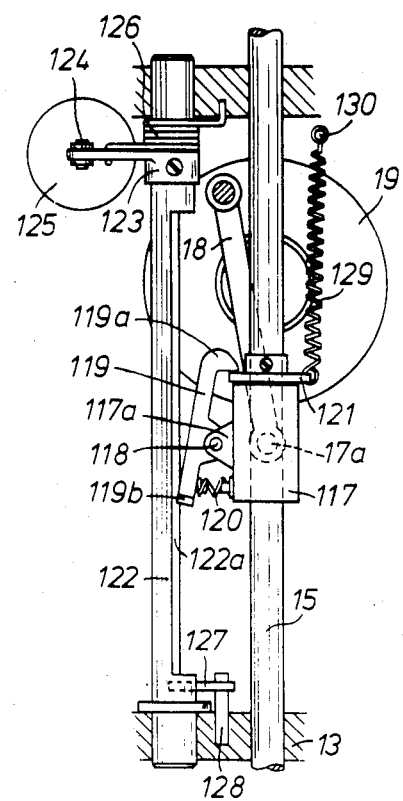

SEWING MACHINE FOR PRODUCING A STITCH PATTERN

FIELD AND BACKGROUND OF THE INVENTION

The present invention relates in general to sewing machines and in particular to a new and useful sewing machine with an electronic control unit for producing at least one stitch pattern which consists of a plurality of different single stitches with a RAM for entering into storage at least the single stitches of the stitch pattern, and with feed means whose feed adjustment is effected by a step motor controlled in accordance with stored data on the RAM during an inactive phase of the feed means.

In stitch patterns stored in electronic sewing machines, the stitch sequence is selected so that the variation of a step motor for the forward movement of the cloth feeder cannot exceed a certain amount.

For the free programming of stitch patterns by the operator it is necessary not only to limit the stitch length to be executed between the individual stitches to the maximum stitch length that the machine can execute, but also provision must be made that the time available to the step motor for execution of the displacement amount is not exceeded. Now in order to obtain a sufficiently fine gradation of the stitch length, the displacement of the step motor is divided into so large a number of steps that only the number of steps which corresponds to a certain limited stitch length variation, e.g. of 6 mm, can be executed with each stitch change. Owing to this, a displacement of the step motor from a relatively large forward stitch to a relatively large backward stitch cannot easily be executed within the time available at high sewing speeds.

When setting the step motor between two successive stitches, for example, from +4 mm to −3 mm, there results a total step displacement at the step motor with a number of steps which corresponds to a stitch length variation of 7 mm. For setting the step motor from stitch length +6 mm to the stitch length −6 mm there would result a number of steps which would correspond to a stitch length variation of 12 mm.

For such a step displacement to be possible, the sewing speed must be greatly reduced at least when this excessive number of steps occurs, otherwise it must be accepted that a stitch will be produced in the wrong place and the executed pattern will be distorted, because also the subsequent stitches will be shifted accordingly.

Another possibility would be that, if the operator enters in the program a stitch sequence with an excessive displacement of the step motor, the program control unit prodcues an indication of the non-feasibility of this pattern sequence. The operation, however, would then have to carry out a subsequent pattern change. Such a possibility does not exist if, after the pattern has been entered in the program, the pattern length can still be changed by the operator, because then the overstepping of the permissible number of steps of the step motor is dependent not only on the programmed data for the displacement of the work, but also on the data alteration entered later. In fact, depending on the selected pattern length, identical stitch sequences of the programmed pattern are then either possible or not possible.

SUMMARY OF THE INVENTION

It is the object of the present invention to make possible, during a consecutive stitch execution, a feed variation which does not exceed the maximum performable steps of the step motor per stitch formation, without impairment of the pattern development.

In accordance with the invention, a sewing machine with an electronic control unit having a read-and-write memory or RAM for storing stitches of a pattern, includes a comparator which, prior to executing a displacement of a feed mechanism in the sewing machine, compares the magnitude of the displacement of a step motor in the mechanism with a given maximum amount of displacement to prevent stitch formation between the insertion point of a preceding stitch and the desired insertion point of the next following stitch when the maximum amount of displacement is exceeded. This results in a surprisingly simple solution for maintaining undistorted stitch patterns even if the number of steps required for the displacement of the step motor is greater than the number of steps that can be executed in the time provided.

In accordance with another feature of the invention, an intermediate stitch is executed for which the needle position of the preceding stitch is maintained and the cloth feed is set on zero. The needle is again inserted at the same insertion point as before. By that time the step motor has taken at least so many steps that its maximum step capacity per stitch formation is no longer exceeded, so that it can execute with certainty the step displacement still required for the following stitch.

In accordance with another feature of the inventive sewing machine, stitch formation is prevented altogether. The subdivision of the necessary total number of steps of the step motor for the cloth advance can here occur as may be appropriate. It is then dependent only on the maximum number of executable steps per stitch formation.

A further object of the invention is to provide a method and apparatus for an electronically controlled sewing machine which can be used to avoid the formation of deformed or incorrect stitches in a stitch pattern and which is simple in design rugged in construction and economical to manufacture.

The various features of novelty which characterize the invention are pointed out with particularity in the claims annexed to and forming a part of the disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings, three embodiments of a sewing machine in accordance with the invention are illustrated as follows:

FIG. 4 is a representation to explain a part of the memory content of the sewing machine memory;

FIG. 8 is an enlarged front view, partly in section of modified parts of the needle bar drive of the sewing machine shown in FIG. 1 of a second embodiment of the invention.

DESCRIPTION OF THE PREFERRED EMBODIMENTS

Figure 1:
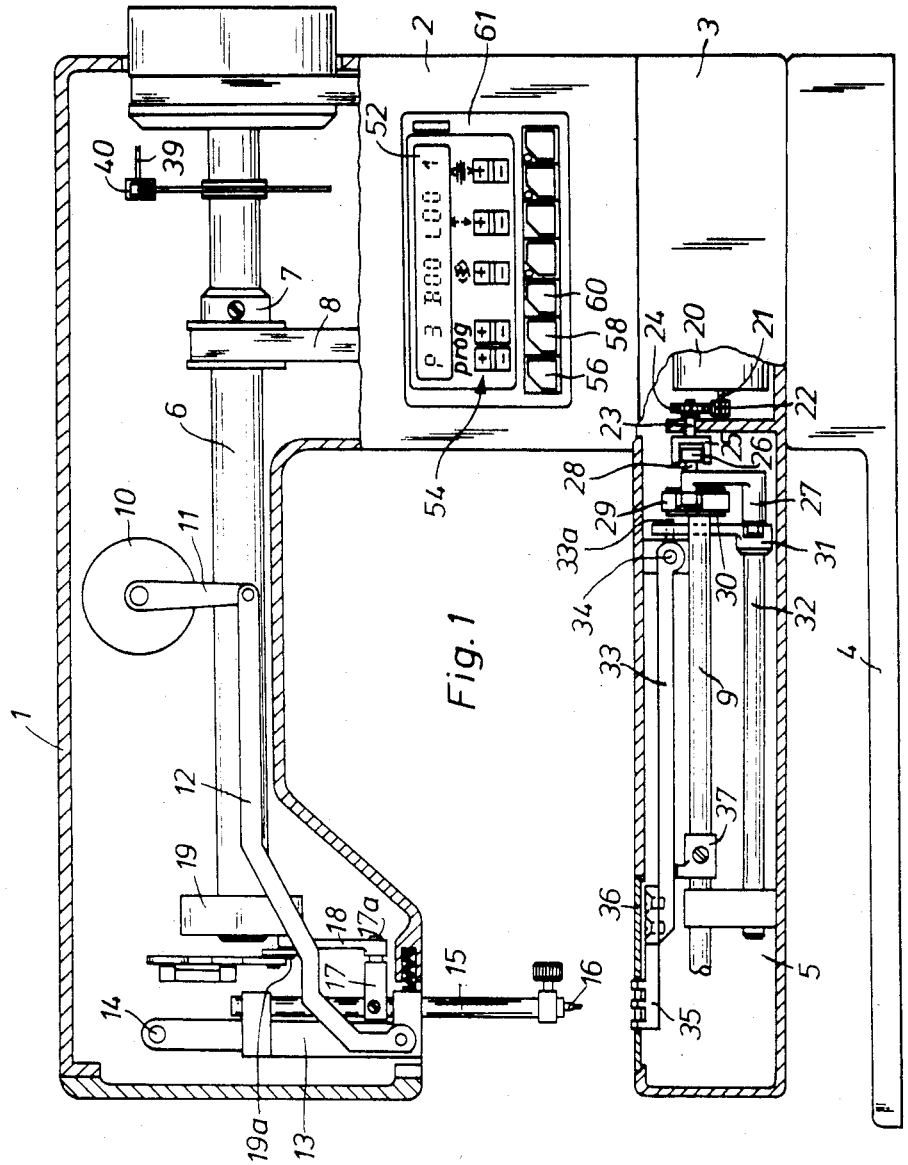
FIG. 1 is a side view of a first embodiment of a sewing machine with a drive for the stitch position and a feed control.

The sewing machine illustrated in FIG. 1 comprises an arm 1 which is connected through a standard 2 to a pedestal 3. Pedestal 3 is carried by a bottom plate 4 and is widened toward the front relative to the standard 2 and arm 1. It is equipped with a cloth supporting arm 5 set back relative to the center axis of pedestal 3, in which arm are accommodate the lower stitch-forming tools, in particular the looper and feed dog mechanism of the sewing machine.

A main shaft 6 mounted in arm 1 of the sewing machine drives, via a gear 7 and belt 8, a lower shaft 9 which serves to drive the looper in known manner (not shown).

In arm 1 a step motor 10 is provided, which via a crank 11 and connecting rod 12 is connected to a needle bar pendulum 13. The pendulum 13 is hinged in arm 1 by a stud 14 and carries a vertically movable needle bar 15 with a needle 16. The needle bar 15 is firmly connected to a holder 17 carrying a pin 17a. At pin 17a there engages a link 18 which is articulated via a stud 19a to a crank 19 secured on the main shaft 6.

In the pedestal 3, a step motor 20 is fastened, whose shaft 21 drives via a pinion 22 a gear 24 fastened on an adjusting shaft 23. Fastened on the adjusting shaft 23 is a slideway 25, in whose path a sliding block 26 is guided. The slideway is fastened on a stud 28 mounted in a link 27. An eccentric bar 29 which spans an eccentric 30 mounted on shaft 9, engages at stud 28.

Link 27 is connected to one arm of an angle lever 31 which is fastened on a shaft 32 mounted in the cloth carrying arm 5. A second, upwardly projecting arm of angle lever 31 has at its end a guide slit in which a pin 33a of a support arm 33 is guided. The latter is displaceably mounted on a horizontal axle 34 fastened in the cloth carrying arm 5 parallel to the feed direction. At its free end the support arm carries a feed plate or dog 35 whose teeth act on a workpiece through slits in a stitch plate 36. The support arm 33 takes support on a cam 37 fastened on shaft 9. Plate 35 and needle 16 with the looper cooperate to form stitches.

Figure 2:
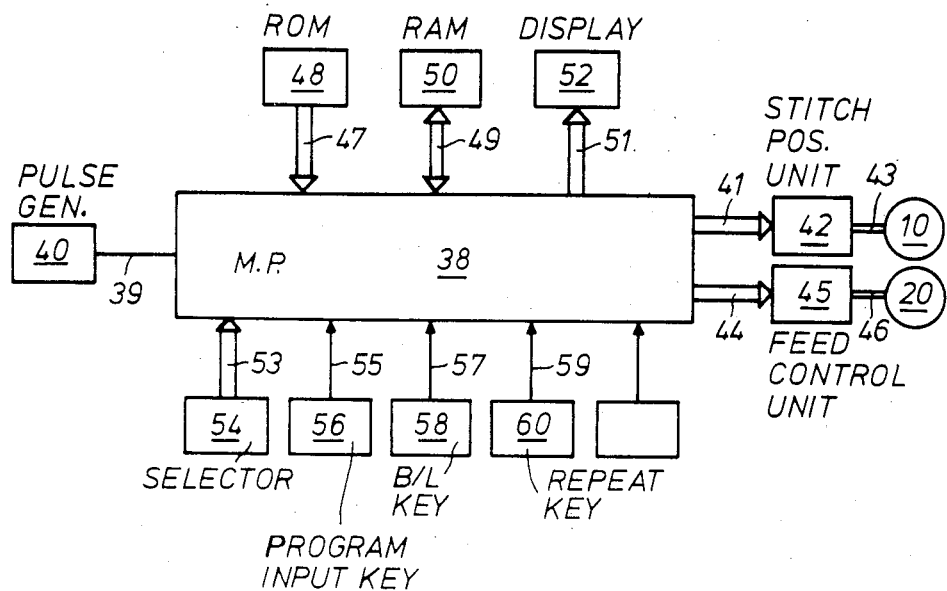
FIG. 2 is a block circuit diagram of the control system of the sewing machine.

In the housing of the sewing machine a microprocessor 38 (FIG. 2) is provided, which is connected via lines 39 to a pulse generator 40 driven synchronously by the main shaft 6 of the sewing machine. At every revolution of the machine, the pulse generator 40 sends a pulse to the microprocessor 38 whenever the needle 16 has left the work and the step motor 10 can adjust the needle bar position; and also when the feed plate 35 has ended its feed movements and the step motor 20 can execute the control of the new feed amount. Connected to the microprocessor 38 via lines 41 is a stitch position control unit 42 which is connected via lines 43 to the step motor 10. Via lines 44 the microprocessor 38 is connected to a feed control unit 45, and unit 45 is connected to the step motor 20 over line 46.

Also connected to the microprocessor are, via line 47, a permanent memory ROM 48, via lines 49, a working memory RAM 50, and via lines 51, a display unit 52. In addition there are connected to the microprocessor 38, via lines 53, a selector 54, via a line 55 a program input key 56, via a line 57 a B/L (width/length) key 58 and via a line 59 a repeat key 60.

The two step motors 10 and 20 are identical in their design and basic control. Step motor 10 serves to control the lateral pendulum motion of the needle bar pendulum 13, while step motor 20 is provided to control the shifting movement of the feed plate 35. The design and operation for the microprocessor control unit is generally known, so that a description is dispensed with. Details of the control of step motors by a microprocessor or microcomputer are described for example in German OS 29 42 844 (U.S. Pat. No. 4,404,509). Thus, motors 10 and 20 with their attached linkages act to adjust the stitch forming means that move the needle pendulum and feed plate.

On the front panel of the sewing machine housing a control plate 61 (FIG. 3) is fastened. In it the display unit 52 is accommodated. It consists of a section 62 with three display elements and a section 63 with eleven display elements. In section 62 the stitch patterns to be called are displayed by a two- or three-digit symbol. In section 62 there can also be called one or more memory sections, into which are entered, in a manner to be described later, the coordinate data of successive single stitches of one or more stitch patterns to be programmed by the operator.

Section 63 comprises three sub-sections 64, 65, 66 of which normally subsection 64 indicates the set overstitch width in mm, subsection 65 the set feed length in mm, and the third section the pattern length in mm.

Correlated with section 62 are two rocker keys 67 and 68, forming the selector 54. The right hand rocker key 68 serves to switch up (+) or down (−) the number formed by one or both of the display elements in 62 at right. The left rocker key 65 serves for the independent switching up (+) or down (−) of the numeral or letter formed with the display element at left.

Below each of the display elements of the subsections 64, 65, 66 again rocker keys 69, 70, 71 are arranged. These serve as manual setting means for upward (+) or downward (−) switching of the values displayed in the subsections 64, 65, 66.

Below the rocker keys 67 to 71, a number of touch contact switches for different sewing functions are arranged, including the program input key 56, and B/L key 58, and the repeat key 60. The display elements of the display unit 52 are connected via the lines 51 to the microprocessor 38, which can connect them to a program memory formed by a part of the working memory 50.

The electronic control section of the sewing machine is constituted so that the control commands for the step motors 10 and 20 of each individual stitch of a stitch pattern are stored in coded form in the permanent memory 48 connected to the microprocessor 38 and then can be entered via the preselected pattern number in the desired sequence into the program memory contained in the working memory 50.

To this end, a plurality of stitch patterns are stored in binary form in the permanent memory 48. The individual stitch pattern may consist of a sequence of any length of single stitches, or of one single or very few single stitches. At the beginning of each stored stitch pattern, a pattern number and several specific data for this pattern, as for instance standard width, standard stitch length, standard pattern length, maximum length, etc., are stored. Then follow the stitch position and feed coordinates which are preset for producing the stitch pattern.

During the sewing process, the coded control data of the respective pattern contained in coded form in the permanent memory 48 are then called one after the other by the microprocessor 38 in accordance with the selected stitch pattern. Via the stitch position control unit 42, the microprocessor 38 controls the step motor 10 for the lateral pendulum movements of the needle bar pendulum 13, and via the feed control unit 45, the step motor 20 for the transport movements of the feed plate 35 in accordance with the successive stitch data.

To execute stitch formation, step motor 10 swings via crank 11 and connecting rod 12 the needle bar pendulum 13 into the new stitch position for the needle 16. Step motor 20 displaces the slideway 25 via pinion 22 and gear 24. During the swing-out motion of stud 28 by the eccentric rod 29 the sliding block 26 is moved back and forth in the slideway 25. Via link 27 the sliding block 26 pivots the angle lever 31 in accordance with the angular position of slideway 25. The angle lever 31 moves the support arm 33 back and forth on axle 34 and in so doing imparts to the feed plate 35 attached at its free end shifting movements whose size and direction depend on the angular position of slideway 25 and hence on the step position of step motor 20.

In the present embodiment, the number of steps which the step motor can execute between its two end positions is 72 steps. Here the step position 0 means that the step motor 20 displaces the slideway 25 so that the feed plate 35 executes a shift amount of 6 mm counter to the normal feed direction (−6 mm). At step position 36 the slide way 25 is in zero position, i.e. feed plate 35 executes no forward movement, while in step position 72 feed plate 35 executes a shift amount of 6 mm in the normal feed direction (+6 mm). In the intermediate step positions, corresponding advances lying between said feed amounts and directions are executed by the feed plate 35. As the sewing maching control is turned on, the step motor 20 is normalized to step position 36.

In concordance with the shift movement, the lifting movement of feed plate 35 is effected by the lift cam 37 fastened on shaft 9, with the teeth of the feed plate 35 rising over the surface of stitch-plate 36 and coming into engagement with the work.

The working memory 50 contains a program memory P (FIG. 4) with a certain quantity of memory cells in which the operator himself can program and enter one or more stitch patterns e.g. P2, P3, P4.

Figure 3:
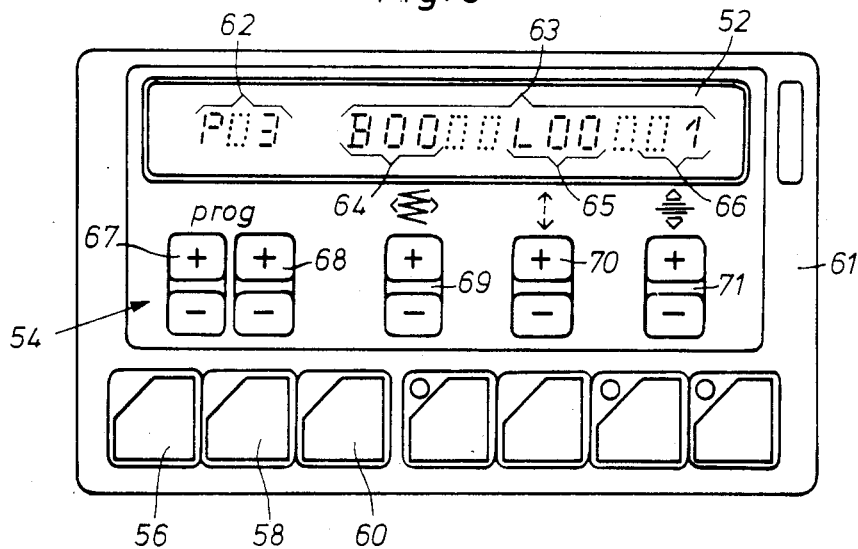
FIG. 3 is an enlarged representation of the switch panel on the front of the sewing machine, with display unit.
Figure 5:
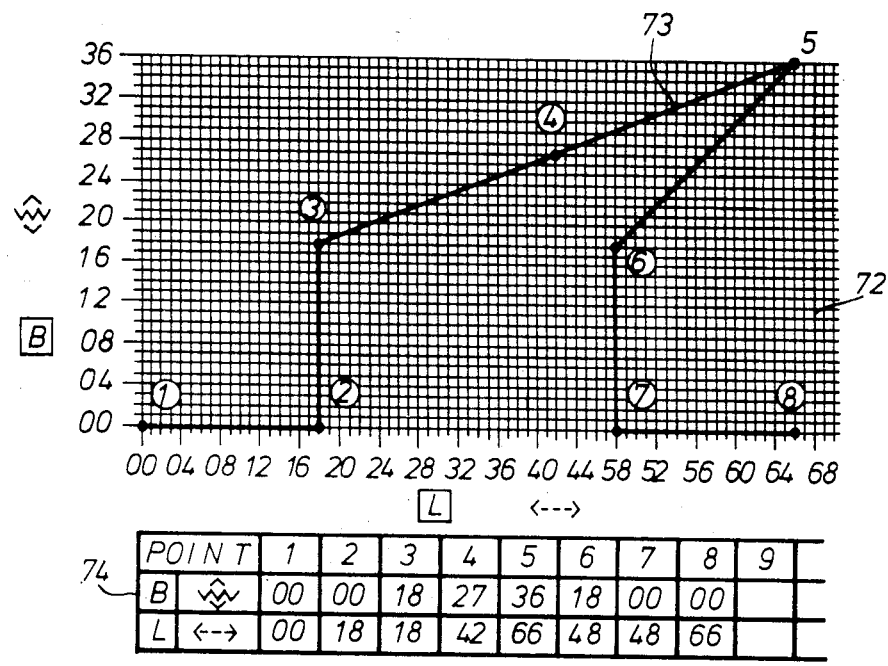
FIG. 5 is a diagram for producing a freely programmable stitch pattern.

Before such a stitch pattern is stored, it is drawn in a diagram 72 represented in FIG. 5, e.g. by a line 73 with the insertion points 1 to 8 corresponding to the future seam line. Now the vertical and horizontal coordinates of the individual insertion points 1 to 8 are entered as width (or bight B) and length (L) in the table 74 belonging to the diagram 72. Subsequently these coordinates can be fed into the program memory P of the working memory 50. To this end, a portion in area 62, e.g. P3, of the program memory P is preselected with the rocker keys 67, 68, as shown in FIGS. 3 and 4.

Then the B/L key 58 is depressed. There appears in the display field 64 "B00", in the display field 65 "L00" and in the display field 66 a "1". This means that input of the coordinates for the first stitch can be carried out. From the table 74 in FIG. 5 it can be seen that the width B=00 and the length L=00, so that the coordinates shown in the display field 52 of FIG. 3 already correspond to the first stitch and are entered into the cells 1 and 2 of the memory portion P3 (FIG. 4) by pushing the program input key 56. Cell 1 of the memory portion P3 then contains the amount 00 of the entered feed coordinates VK1 and cell 2 the amount 00 of the needle coordinates NK1, as FIG. 4 shows schematically.

At the same time the number in area 66 is increased to "2", thereby indicating that the coordinates for the second stitch can be put in from table 74. Via the rocker key 70 the number next to L in the display field 52 is set to "18", the number next to B remains "00". Via the progam input key 56 the coordinates VK2 and NK2 for the second stitch are now put in and read into the cells 3 and 4 of the memory portion P3.

The number "3" in area 66 thereupon indicates the readiness of memory P3 to receive the coordinates for the third stitch, which are entered, like all additional stitch coordinates, in the described manner until all coordinates of the selected eight stitches of the stitch pattern to be programmed are entered. In this manner stitch sequences with any desired single stitches can be stored. The only condition is that the spacing of two single stitches from each other must not exceed the stitch spacing that can be produced by the stitch forming tools. This may be contained in the program of the machine already, so that the operator does not have to pay any attention to this rule.

After the following operation of the repeat key 60, the point Z (FIG. 4) correlated with the working memory portion P sets itself internally to cell 1 with the content VK1.

In addition, after actuation of the repeat key 60, the microprocessor 38 computes the maximum amount of the stitch width B and stitch length L present in the particular stitch pattern P3, and it indicates these amounts in the areas 64 and 65. The operator can now modify the pattern width and pattern length of the selected stitch pattern P3 by changing the displayed maximum amounts in areas 64 and 65 by using the rocker keys 69 and 70. In the subsequent sewing of the pattern, all width or length values are then changed according to the modified ratio of the now set maximum value to the stored maximum value.

The sewing process can now begin. As the sewing machine is being driven after emergence of the needle 16 from the stitch plate 36 the microprocessor 38, controlled by the pulse generator 40, interrupts the program just then running instead runs, inter alia, a subprogram LERAM, with which the stitch coordinates are read out of the program memory portion P3 displayed in the display unit 52.

FIG. 4 shows the organization of the program memory P. The coordinate values VK and NK for each stitch are stored in pairs of successive cells 1, 2, 3, 4, . . . of the memory portion P3. The pointer Z determines which coordinate VK or NK is read out from the memory portion P3 as the sub-program LERAM is being called. At the start of sewing, pointer Z is set on cell 1 with the content VK1 and is then increased by 1, by the pulse generator 40, with every half revolution of the machine. The end of the pattern having been reached, pointer Z is set back to the beginning of the pattern (cell 1 with content VK1).

Figure 6:
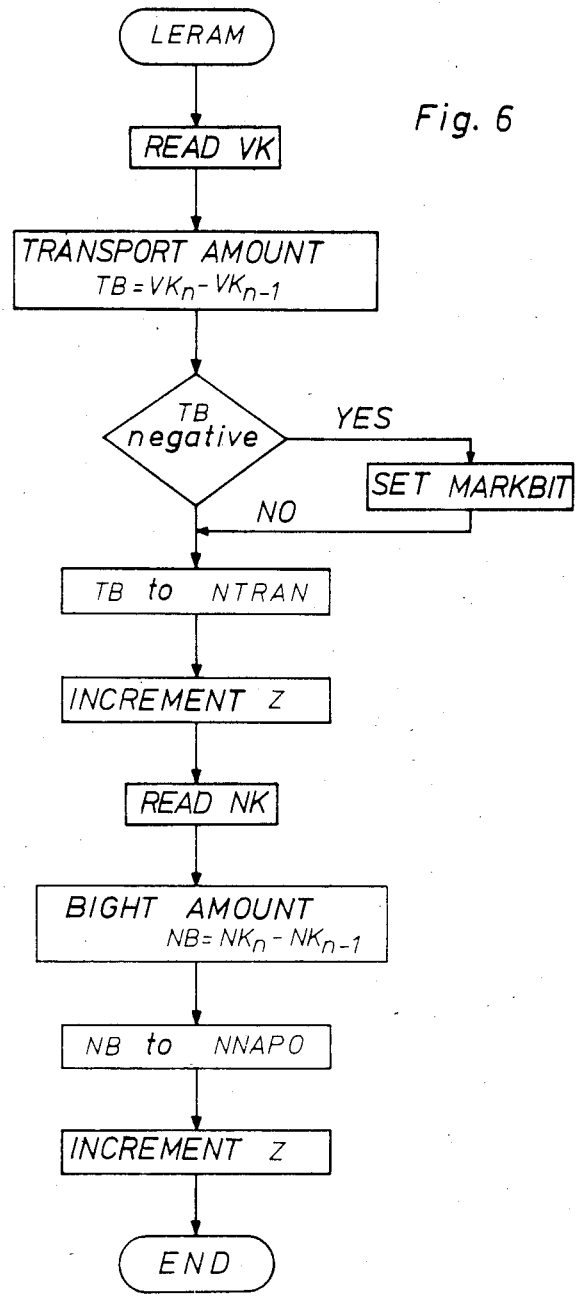
FIGS. 6 and 7 are flow diagrams with details of the process steps of the programs stored in the program memories of the control unit.

In the sub-program LERAM (FIG. 4 and 6) first the cloth coordinate VK is read out from the program memory portion P3, and the transport amount $TB = VK_n - VK_{n-1}$ is calculated. If it is positive, the transport amount TB is then written into an existing temporary memory cell NTRAN. For a negative amount the microprocessor 38 sets at the same time a label or mark bit which indicates that the cloth displacement is counter to the normal direction.

Thereafter pointer Z is increased by 1, the needle coordinate NK is read out of cell 2 of the program memory portion P3, and the needle movement amount $NB = NK_n - NK_{n-1}$ is calculated. This value is then written into an existing temporary memory call NNAPO. Then pointer Z is increased by 1 again. The LERAM program is thus finished. In the further course of the main program of microprocessor 38, the number of steps to be carried out by step motor 10 for the movement of the needle bar pendulum 13 is then calculated with reference to a further sub-programm in a manner not described in detail, the respective direction of rotation is determined, and the control of step motor 10 is carried out. This will then move the needle bar pendulum 13 into the new stitch position for the needle 16 via crank 11 and connecting rod 12.

Figure 7:
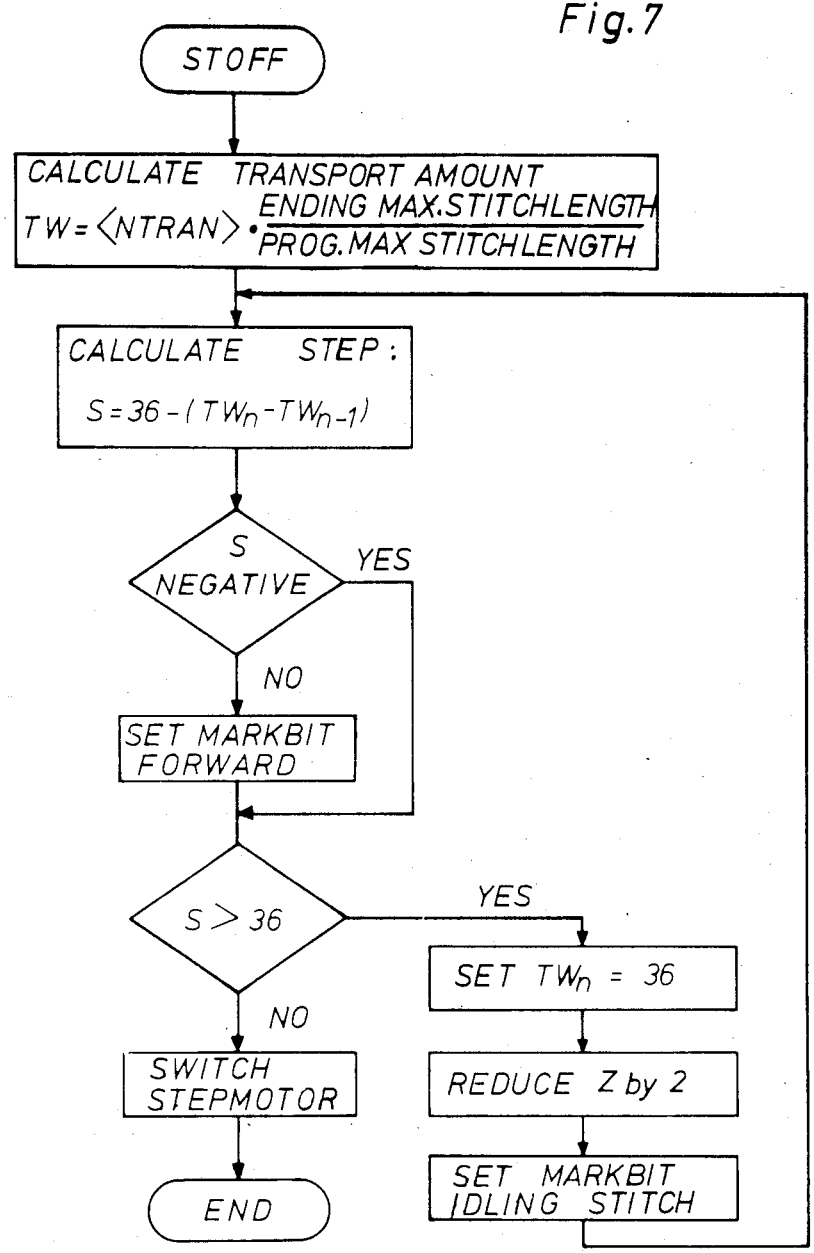

For instance after about one half revolution of the main shaft 6 from the pulse generation of the pulse generator 40 to the working up of the sub-program LERAM the pulse generator 40 delivers, immediately after the lowering of the feed plate 35 under the surface of the stitch plate 36, an additional pulse to the microprocessor 38, whereby the latter interrupts the program just then running in order to work up instead a sub-program STOFF (FIG. 7). With this sub-program the adjustment of slideway 25 required for the next displacement is calculated and thereafter the step motor 20 which carries out this adjustment is controlled accordingly.

Specifically, first the transport value TW actually to be executed is calculated according to the sub-program STOFF. This takes place in that the content of the cell NTRAN in the temporary memory is multiplied by the ratio of the maximum stitch length given at the end of the input of the stitch pattern P3 to the maximum stitch length calculated from the data entered in the program. Now the number of steps S to be executed for the displacement of the step motor 20 is calculated in that the difference between the new transport value $TW_n$ and the transport value of the preceding stitch $TW_{n-1}$ is subtracted from the number 36, a label or mark bit possibly placed in the sub-program LERAM being taken into consideration as negative sign for the transport value.

If in the following test the number of steps S is negative, immediately another test is carried out; if S is not negative, first a label bit "Forward" is set and then the additional test is carried out. In this test it is tested whether the number of steps S is greater than the number 36, because only 36 steps can be executed by the step motor 20 in the available time. If the number of steps 36 is not exceeded, the microprocessor 38 controls thereafter the displacement for the step motor 20, the direction of rotation of the step motor 20 being established by the "Forward" label being set or not set.

If, however, the number 36 is exceeded in the test, then the value 36 is set as the new transport value $TW_n$ and the pointer Z in the program portion P3 is lowered by two, i.e. set back by two cells. In the illustrated embodiment in FIG. 4 this is the case when pointer Z appears for the first time at the marked location Z'. It is then reset to Z", that is, from cell 11 to cell 9.

Thereafter a jump back occurs in the sub-program and the number of steps of step motor 20 is again calculated, the further process steps of the program taking place in the order already described. The new number of steps S can now not exceed the number 36, so that with the next process step the step motor 20 is displaced. Since as new transport value the value 36 was taken as basis, the displacement is such that the step motor 20 now pivots the guideway 25 into its zero transport position and thus the feed plate 35 does not exert a displacing movement on the work during the following feed phase of the sewing machine. By the set label "Idling stitch" it is prevented at the same time that step motor 10 moves the needle bar 13 into a new position, so that needle 16 is inserted in the previously punctured hole in the work. Thus an intermediate stitch is formed which coincides with the preceding stitch.

As a result of the resetting of pointer Z in the sub-program by two cells, the coordinates in the cells 9 and 10 of the pattern stitch not carried out is again read out by the sub-program LERAM, whereupon the formation of this stitch is controlled by the subprogram STOFF.

In a second embodiment of the invention, the sewing machine differs as to its structural design from the arrangement shown in FIG. 1 only in the possibility of disconnecting the needle bar. To this end, as FIG. 8 shows, the holder 17 on the needle bar 15 is replaced by a tappet sleeve 117 carrying the pin 17a. The tappet sleeve 117 comprises two parallel bearing pieces 117a, between which a toggle lever 119 is fastened by means of a pin 118. At one end the toggle lever 119 is designed as a tapper hook 119a and at the other end it comprises a laterally bent projection 119b. Lever 119 is, under the action of a spring 120, arranged between tappet sleeve 117 and the toggle lever end at which the projection 119b is present.

Sliding in the tappet sleeve 117 is the needle bar 15, on which a cross-piece 121 is secured by screwing. When needle bar 15 is connected, tappet hook 119a is in engagement with cross-piece 121.

Parallel to the needle bar 15 a switching shaft 122 is rotatably mounted in the needle bar pendulum 13. On the switching shaft 122 a swinging lever 123 is fastened which, via a link 124, is connected to the armature of an electromagnet 125 secured in the arm of the sewing machine.

Along the movement area of the projection 119b the switching shaft 122 has a cutout, so that there results a switching surface 122a. A torsion spring 126 mounted on the switching shaft 122 and clamped against the needle bar pendulum 13 and switching lever 123 holds the switching shaft 122 in its disconnected inoperative position. This position is determined by the abutment of a pin 127 fastened in the switching shaft 122 against a stop 128 fastened in the needle bar pendulum 13. A spring 129 arranged between cross-pin 121 and a pin 130 fastened in the needle bar pendulum 13 lifts the needle bar 15 to prevent its vertical movement whenever toggle lever 119 is lifted off its cross-piece 121.

The programming and the sequence of operation of the sewing machine occurs in the same manner as in the embodiment according to FIGS. 1 to 7. Only when the sub-program STOFF (FIG. 7) is being run by the microprocessor 38, the latter controls via the label bit "Idling stitch" a single needle disconnection at the next stitch.

To disconnect the needle bar 15 (FIG. 8), the electromagnet 125 is connected via the microprocessor 38, while the needle bar 15 is in its high position. With that, the switching shaft 122 is rotated so that its switching surface 122a gets into the movement path of projection 119b of lever 119. At that, the latter is pivoted counter to the action of spring 120, whereby the tappet hook 119a releases the cross-piece 121.

Spring 129 now holds the needle bar 15 in its high position, while tappet sleeve 117 shifts freely on the needle bar 15. Stitch formation is thereby interrupted.

For reconnection of the needle bar 15, the electromagnet 125 is disconnected, whereupon torsion spring 126 rotates the switching shaft 122 into its inoperative position, in which pin 127 applies against stud 128. At that, the switching surface 122a releases the projection 119b of the lever 119 urged by spring 120, so that during the upward movement of sleeve 117 the tappet hook 119a can snap in behind the cross-piece 121. There by the needle bar 15 is connected again.

Figure 9:
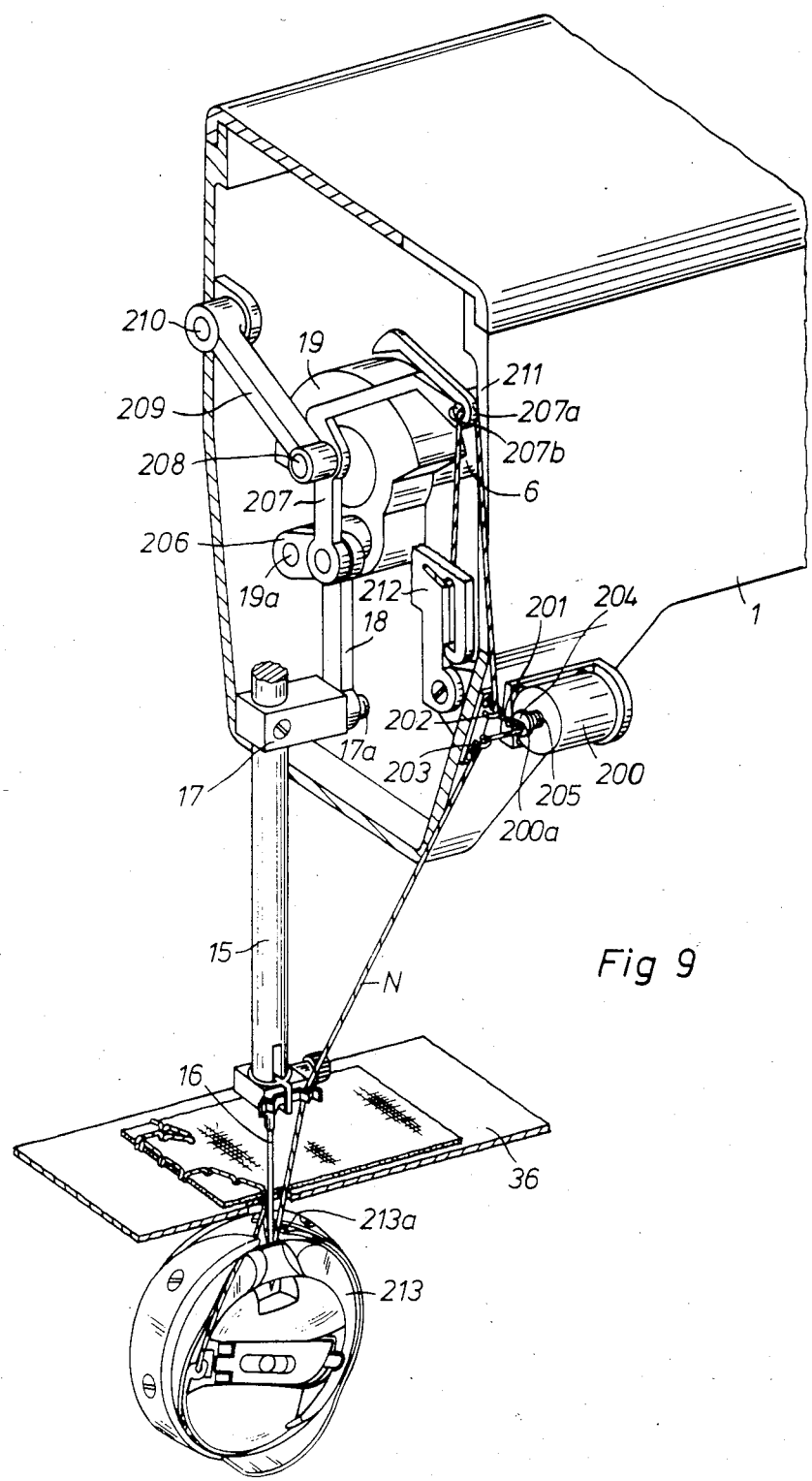
FIG. 9 is a perspective representation partly in section, of the front portion of the sewing machine shown in FIG. 1 with thread lever drive and shuttle and with modifications according to a third embodiment of the invention.

In a third embodiment of the invention, the sewing machine comprises in addition to the arrangement shown in FIG. 1 a pull-out means for the needle thread. To this end, as FIG. 9 shows, there is fastened on the front of arm 1 of the sewing machine an electromagnet 200, the pull rod 200a of which carries an eyelet 201, which normally projects between two eyelets 202 and 203 fastened on arm 1 for conduction of a needle thread N. In order that eyelet 201 will remain in this position, there is fastened on the pull rod 200a a disc 204 urged by a spring 205 which is mounted on pull rod 200a and is clamped between disc 204 and the housing of electromagnet 200.

Via an arm 206 connected with crank 19 and stud 19a, the main shaft 6 drives a spring lever 207. The latter is articulated by a joint 208 to an arm 209, which is mounted to pivot about a stud 210 fastened in arm 1. The end 207a of thread lever 207 projects through a vertical slit 211 of arm 1 and comprises a thread guide 207b. The needle thread N extends from a spool not shown to a thread tensioning device also not shown by way of a deflection 212 in arm 1, the thread guide 207b of thread lever 207, the eyelets 202, 201 and 203 to the eye in the needle 16, and thence to the last stitch in the work. Cooperating with the needle 16 in known manner is a looper 213 whose tip 213a seizes the loop of the needle thread N during stitch formation.

In this embodiment, the prevention of stitch formation differs from the embodiment according to FIG. 8 in that the microprocessor 38 does not bring about a disconnection of the needle bar 15 via the label bit "Idling stitch", but prevents stitch formation by the shuttle 213 of the sewing machine not seizing the loop of the needle thread N.

For the looper 213 not to seize the loop of the needle thread N, the electromagnet 200 is connected via the microprocessor 38 when needle 16 has reached its lowest point. The needle thread loop normally forming as needle 16 goes up is drawn off by the eyelet 201 moving to the side and the needle thread N at the eye of the needle 16 is tensioned. No loop can form. Under these circumstances the tip 213a of looper 213 misses the loop of needle thread N and stitch formation does not occur as the needle thread N and the bottom thread do not interlock. As soon as the looper tip 213a has passed through the needle path, the electromagnet 200 is disconnected by the microprocessor 38 and spring 205 pushes eyelet 201 back into its inoperative position between the two eyelets 202 and 203.

While specific embodiments of the invention have been shown and described in detail to illustrate the application of the principles of the invention, it will be understood that the invention may be embodied otherwise without departing from such principles.

What is claimed is:

1. A sewing machine for producing at least one stitch pattern in a workpiece, the stitch pattern consisting of a plurality of different single stitches which are formed in a sequence, comprising:
   stitch forming means for forming stitches in a sequence;
   a workpiece feeding mechanism operatively connected to said stitch forming means and having a workpiece feeder, said feeding mechanism including feeder drive means for moving said feeder alternately to execute an active workpiece moving motion and an inactive return motion;
   setting means connected to said drive means for varying the size and direction of the feeder motion;
   a step motor connected to said setting means for setting said setting means during the inactive return motion of said feeder;
   electronic control means connected to said step motor and including a read-and-write memory for receiving into storage the single successive stitches of the stitch pattern; said electronic control means also including means for controlling the displacement amount of said step motor and comparator means for comparing the displacement amount of the step motor to a selected maximum amount; and
   means for preventing a stitch formation from the final point of penetration of a stitch and the initial point of penetration of the successive stitch when the displacement amount exceeds the selected maximum amount.

2. A sewing machine according to claim 1, wherein said stitch forming means includes a needle bar and means for reciprocating said needle bar, said means for preventing comprising means for disconnecting said needle bar from means for reciprocating said needle bar.

3. A sewing machine for producing at least one stitch pattern consisting of a plurality of different single stitches which are formed in a sequence, comprising:
   stitch-forming means for forming stitches in a sequence;
   stitch-adjusting means for adjusting said stitch-forming means to move successive points of penetration for forming stitches, said stitch-adjusting means including at least one step motor having a displacement amount which is adjustable to control the displacement amount between successive points of penetration;
   electronic control means including a read-and-write memory for receiving into storazge the single successive stitches of the stitch pattern, said electronic control means also including means for controlling the displacement amount of said step motor, said electronic control means having comparator means for comparing the displacement amount of the step motor to a selected maximum amount, the displacement amount of the step motor corresponding to a displacement between a final point of penetration for a first stitch in the memory and an initial point of penetration for a successive stitch in the memory; and means for forming an intermediate stitch which corresponds to the stitch preceding the successive stitch for preventing displacement from the final point of penetration of the first stitch and the initial point of penetration of the successive stitch when the displacement amount exceeds the selected maximum amount.

4. A sewing macnine for producing at least one stitch pattern consisting of a plurality of different single stitches which are formed in a sequence, comprising:

stitch forming means for forming stitches in a sequence, said stitch-forming means including a looper for catching a thread to form a stitch;

stitch-adjusting means for adjusting said stitch forming means to move successive points of penetration for forming stitches, said stitch-adjusting means including at least one step motor having a displacement amount which is adjustable to control the displacement between successive points of penetration;

electronic control means including a read-and-write memory for receiving into storage the single successive stitches of the stitch pattern, said electronic control means also including means for controlling the displacement amount of said step motor, said electronic control means having comparator means for comparing the displacement amount of the step motor to a selected maximum amount, the displacement amout of the step motor corresponding to a displacement between a final point of penetration for a stitch in the memory and an initial point of penetration for a successive stitch in the memory; and means for pulling thread away from said looper to prevent formation of a stitch for preventing displacement from the final point of penetration of the stitch to the initial point of penetration for the successive stitch when the displacement amount exceeds the selected maximum amount.

5. A method of forming a stitch pattern using a sewing machine having an electric control unit for producing at least one stitch pattern consisting of a plurality of different single stitches each having an insertion point and being in a sequence to form the pattern which insertion points of successive stitches being separated by an actual displacement amount, the sewing machine having feed means with a step motor which is adjustable for adjusting the actual displacement amount, the method comprising:

storing information corresponding to each insertion point for successive stitches in a read-and-write memory;

comparing an adjustment amount necessary for the step motor to achieve the actual displacement amount between insertion points of successive stitches, to a maximum selected displacement amount before the formation of the stitch; and preventing formation of the stitch if the adjustment amount for the step motor to effect the actual displacement amount exceeds the selected maximum displacement amount, the preventing of formation of a stitch being accomplished by causing formation of a preceding stitch.

6. A method according to claim 5, including forming stitches by supplying a thread to a looper an preventing formation of a stitch by withholding thread from the looper.

7. A method of forming a stitch pattern using a sewing machine having an electric control unit for producing at least one stitch pattern consisting of a plurality of different single stitches each having an insertion point and being in a sequence to form the pattern with insertion points of successive stitches being separated by an actual displacement amount, the sewing machine having feed means with a step motor which is adjustable for adjusting the actual displacement amount, the method comprising:

storing information corresponding to each insertion point for successive stitches in a read-and-write memory;

comparing the adjustment amount necessary for the step motor to achieve the actual displacement amount between insertion points of successive stitches to a maximum selected displacement amount between the formation of the stitches; and stitches being formed by supplying a thread to a looper and preventing formation of a stitch by withholding thread from the looper.

* * * * *